(12) United States Patent
Chen

(10) Patent No.: US 6,760,226 B2
(45) Date of Patent: Jul. 6, 2004

(54) MOUNTING ASSEMBLY FOR DATA STORAGE DEVICES

(75) Inventor: Yun Lung Chen, Taipei (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 44 days.

(21) Appl. No.: 10/038,443

(22) Filed: Jan. 7, 2002

(65) Prior Publication Data

US 2003/0128524 A1 Jul. 10, 2003

(51) Int. Cl.[7] ................................................ H05K 5/03
(52) U.S. Cl. ...................................... 361/725; 361/685
(58) Field of Search .............................. 361/683–686; 248/685, 689, 590, 692, 693, 561, 628, 629

(56) References Cited

U.S. PATENT DOCUMENTS 5,828,547 A * 10/1998 Francovich et al. ........ 361/685
6,122,173 A * 9/2000 Felcman et al. ............ 361/726
6,299,266 B1 * 10/2001 Justice et al. ............. 312/223.2
6,330,147 B1 * 12/2001 Adams et al. .............. 361/679

* cited by examiner

Primary Examiner—Darren Schuberg
Assistant Examiner—Yean-Hsi Chang
(74) Attorney, Agent, or Firm—Wei Te Chung

(57) ABSTRACT

A mounting assembly includes a mounting bracket (10) having a side panel (14), and a clip (40) attached on the side panel. A pair of through holes (18) is defined in the side panel. The clip includes a press portion (42), and a pair of palms (48) on opposite sides of the press portion. Each palm has barbs (49) extending toward the press portion. When the press portion is inwardly pressed, the clip elastically deforms, the palms move away from each other, and the palms extend through the through holes to be received in corresponding locking holes (32) defined in a corresponding data storage device (30). The barbs firmly engage with the storage device at the locking holes, thereby securing the storage device in the mounting bracket. When the press portion is inwardly pressed again, the storage device is unlocked from the mounting bracket.

9 Claims, 3 Drawing Sheets

MOUNTING ASSEMBLY FOR DATA STORAGE DEVICES

BACKGROUND OF THE INVENTION

1. Field of the Invention

The present invention relates to mounting assemblies, and particularly to mounting assemblies that readily attach data storage devices in computer enclosures.

2. Related Art

Various data storage devices are installed in computers for communication and handling of data. Such devices include, for example, hard disk drives, floppy disk drives and CD-ROM drives.

A conventional data storage device is directly attached to a computer enclosure with bolts. However, attachment with bolts is unduly complicated and time-consuming.

Thus rails have been developed to mount a data storage device to a computer enclosure. Such rails are disclosed in U.S. Pat. No. 5,510,955. A mounting bracket forms two pairs of leader rails on opposite sides thereof. Each pair of leader rails defines a pair of first coaxial holes. A pair of guide rails is respectively attached to opposite sides of a data storage device with bolts. Each guide rail comprises a pair of flanges defining a pair of second coaxial holes. The assembly of the storage device and guide rails is inserted into the mounting bracket by sliding the guide rails along the leader rails. A pair of locking pins is then extended through the first and second coaxial holes to thereby secure the storage device within the mounting bracket. However, the needed additional rails increase costs. Furthermore, mounting the rails to the data storage device with bolts is still unduly complicated and time-consuming.

SUMMARY OF THE INVENTION

Accordingly, an object of the present invention is to provide a mounting assembly which can readily attach data storage devices within a mounting bracket and which can readily release the data storage devices from the mounting bracket.

To achieve the above-mentioned object, a mounting assembly in accordance with the present invention comprises a mounting bracket having first and second side panels, and a clip attached on the second side panel. A plurality of grooves is defined in the first side panel, for slidingly receiving screws that are attached on sides of data storage devices. A plurality of pairs of through holes is defined in the second side panel. Each pair of through holes corresponds to a groove. The clip comprises an arcuate press portion, a pair of bent portions bent outwardly from opposite free ends of the press portion, a pair of connecting portions extending from free ends of the bent portions and away from each other, and a pair of hands extending inwardly from free ends of the connecting portions. Each hand has a palm with barbs. In use, the palms are extended through the corresponding through holes into corresponding locking holes defined in an opposite side of the storage device. The barbs are firmly engaged with the storage device at the locking holes. The storage device is thereby secured in the mounting bracket. In removing the storage device, the press portion is pressed inwardly to cause the hands to elastically move away from each other. The barbs are thus released from the storage device, and the clip unlocks the storage device from the mounting bracket.

Other objects, advantages and novel features of the present invention will be drawn from the following detailed description of the preferred embodiment of the present invention with attached drawings, in which:

DESCRIPTION OF THE PREFERRED EMBODIMENT

Figure 1:
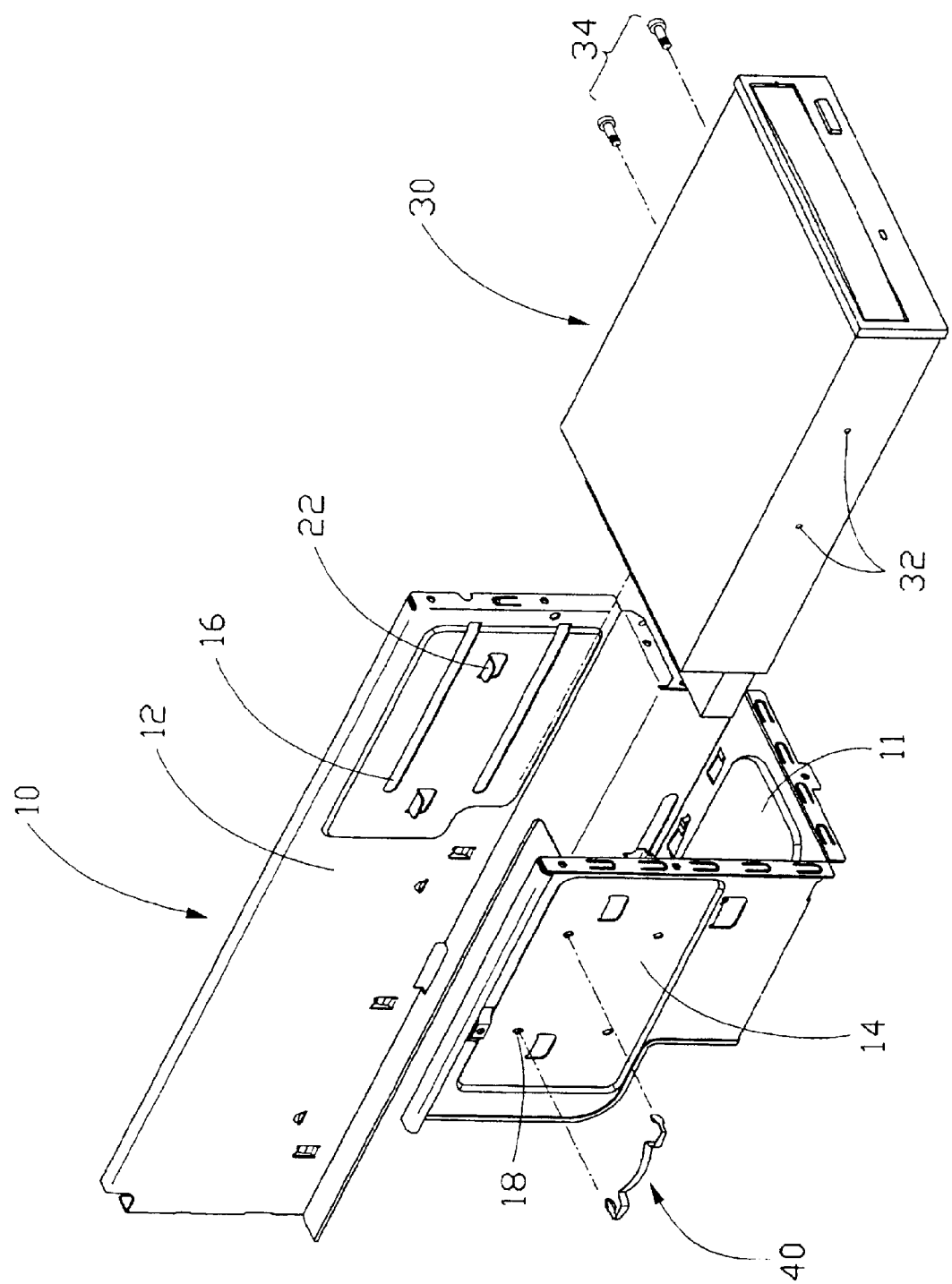
FIG. 1 is an exploded view of a mounting assembly in accordance with the present invention, together with a data storage device.

Referring to the attached drawings, FIG. 1 shows a mounting assembly in accordance with the present invention together with a data storage device 30. The mounting assembly comprises a mounting bracket 10 and a clip 40. The data storage device 30 may be a CD-ROM drive, a hard disk drive, a floppy disk drive, and so on. For convenience, the data storage device 30 is hereinafter designated as a CD-ROM drive 30. A pair of locking holes 32 is defined in each of opposite sides of the CD-ROM drive 30. A pair of screws 34 is for being threadedly engaged in the locking holes 32 in one side of the CD-ROM drive 30.

The mounting bracket 10 comprises a bottom panel 11, a first side panel 12, and a second side panel 14. The first side panel 12 extends perpendicularly upwardly from a side edge of the bottom panel 11. The second side panel 14 extends perpendicularly upwardly from an opposite side edge of the bottom panel 11. A plurality of parallel grooves 16 is defined in the first side panel 12. A plurality of pairs of spaced through holes 18 is defined in the second side panel 14. Each pair of spaced through holes 18 corresponds to a groove 16 of the first side panel 12. A pair of supporting tabs 22 is inwardly stamped from each of the first and second side panels 12, 14, below a top groove 16 and below topmost through holes 18 respectively.

Figure 2:
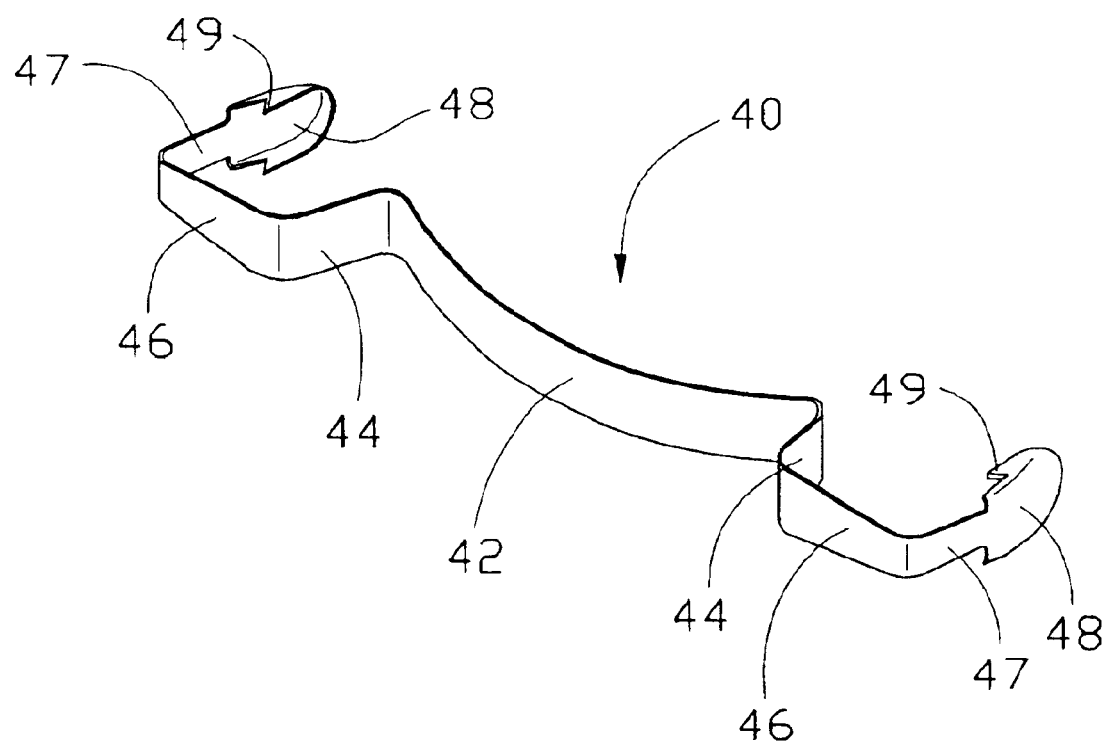
FIG. 2 is a perspective view of a clip of the mounting assembly of FIG. 1.
Figure 3:
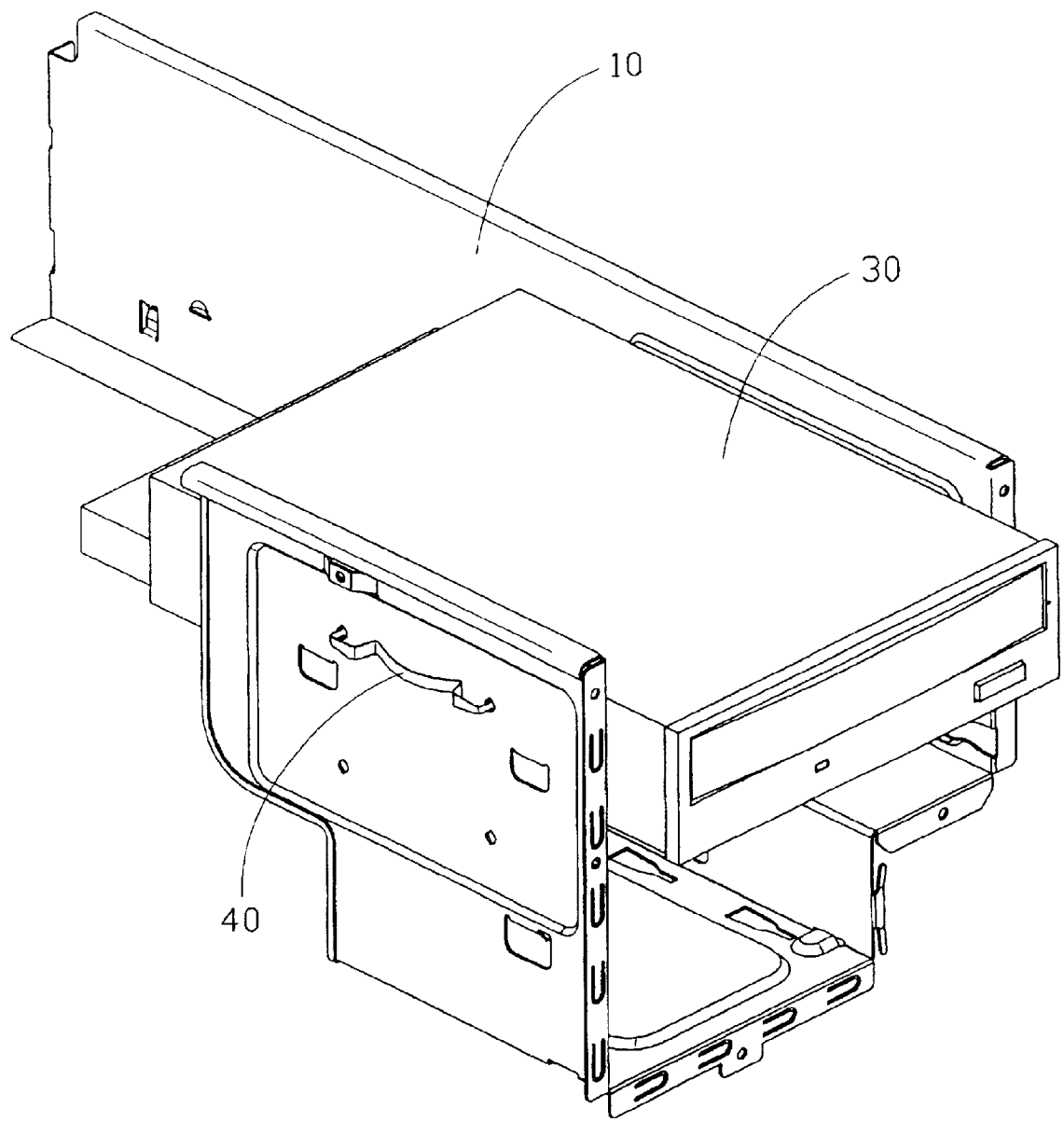
FIG. 3 is a fully assembled view of FIG. 1.

Referring to FIG. 2, the clip 40 is integrally stamped from a strip of metal. The clip 40 comprises a slightly arcuate central press portion 42, a pair of bent portions 44, a pair of connecting portions 46, and a pair of hands 47. The bent portions 44 are bent in substantially the same direction, outwardly and generally perpendicularly from opposite free ends of the press portion 42 respectively. The connecting portions 46 extend generally perpendicularly from free ends of the bent portions 44 respectively, and away from each other. The hands 47 extend in substantially the same direction perpendicularly inwardly from free ends of the connecting portions 46 respectively. Each hand 47 has a palm 48 at an end thereof. A distance between the palms 48 is slightly less than a distance between any pair of through holes 18 of the mounting bracket 10. A pair of barbs 49 is horizontally formed on top and bottom edges respectively of each palm 48. The barbs 49 generally extend toward a center of the clip 40.

In use, the CD-ROM drive 30 is slid into the mounting bracket 10. The screws 34 of the CD-ROM drive 30 enter the top groove 16 of the mounting bracket 10. When the rearmost screw 34 reaches an end portion of the top groove 16, the through holes 18 of the mounting bracket 10 are aligned with the corresponding locking holes 32 of the CD-ROM drive 30. The clip 40 is then placed beside the second side panel 14, with the palms 48 located adjacent the corresponding through holes 18. The press portion 42 is pressed inwardly. The press portion 42, bent portions 44 and connecting portions 46 are elastically deformed. The hands 47 therefore move away from each other, and cause the palms 48 to slide into the corresponding through holes 18 and locking holes 32. When the inward pressing force on the press portion 42 is released, the press portion 42, bent portions 44 and connecting portions 46 elastically return part of the way back to their original positions. The barbs 49 of the palms 48 are therefore firmly engaged with the CD-ROM drive 30 at the locking holes 32. The CD-ROM drive 30 is thus secured in the mounting bracket 10.

In removing the CD-ROM drive 30, the press portion 42 of the clip 40 is pressed inwardly again. This causes the hands 47 to elastically move away from each other. The barbs 49 are thus released from the CD-ROM drive 30. The clip 40 is then readily pulled away from the second side panel 14 and disengaged from the CD-ROM drive 30. The CD-ROM drive 30 is readily slid out from the mounting bracket 10.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting assembly for a storage device comprising:
    a mounting bracket for installing the storage device therein, the mounting bracket comprising a first side panel defining a groove for slidingly receiving screws attached on one side of the storage device and thereby guiding the storage device into the mounting bracket, and a second side panel defining a pair of through holes; and
    a clip detachably attached on the second side panel, the clip comprising a central press portion and a pair of hands, each of the hands having a palm extendable through a corresponding through hole of the mounting bracket, each palm having barbs adapted for firmly engaging with the storage device, wherein
    when the press portion is inwardly pressed, the hands are elastically moved away from each other and extended through the corresponding through holes, thereby causing the palms to enter locking holes of the storage device such that the barbs resiliently engage with the storage device; wherein
    a distance between the palms is slightly less than a distance between the corresponding through holes, and wherein when the clip is attached on the second side panel and the press portion is inwardly pressed, the clip is elastically deformed to cause the hands to move away from each other, and when the palms have entered the locking holes, the clip elastically returns at least part of the way back to its original position to cause the barbs of the palms to firmly engage with the storage device.

2. An electronic device assembly comprising:
    a storage device defining a pair of locking holes in one side thereof and having sliding means provided on an opposite side thereof; and
    a mounting assembly comprising:
        a mounting bracket for receiving a plurality of the storage devices therein, the mounting bracket comprising first and second side panels, the first side panel defining a plurality of grooves to allow a plurality of the sliding means to slide therein and thereby guide the plurality of the storage devices into the mounting bracket, the second side panel defining a plurality of pairs of through holes in alignment with a plurality of pairs of the locking holes respectively;
        a clip detachably attached to the second side panel, the clip comprising a press portion and a pair of palms on opposite sides of the press portion, the palms having barbs extending generally toward the press portion, wherein
        when the press portion is pressed inwardly, the clip is elastically deformed, the palms are moved away from each other to slide though the through holes into the locking holes respectively, and the clip elastically returns at least part of the way back to its original position to cause the barbs to firmly engage with the storage device at the locking holes, thereby securing the storage device in the mounting bracket.

3. The electronic device assembly as claimed in claim 2, wherein the clip further comprises a pair of bent portions bent outwardly from opposite free ends of the press portion, a pair of connecting portions extending from free ends of the bent portions and away from each other, and a pair of hands extending inwardly from free ends of the connecting portions, and wherein the palms are formed at ends of the hands respectively.

4. The electronic device assembly as claimed in claim 2, wherein a distance between the palms is slightly less than a distance between the through holes.

5. The electronic device assembly as claimed in claim 4, wherein when the clip is pressed inwardly again, the hands are elastically moved away from each other to release the barbs from the storage device, the clip thereby readily unlocking the storage device from the mounting bracket.

6. The electronic device assembly as claimed in claim 2, wherein the mounting bracket forms at least one pair of supporting tabs, and the supporting tabs are respectively disposed below the groove and below the through holes for supporting the storage device.

7. An electronic device assembly comprising:
    a storage device defining a pair of locking holes in one side thereof and having sliding means provided on an opposite side thereof; and
    a mounting assembly comprising:
        a mounting bracket receiving the storage device therein, the mounting bracket comprising first and second side panels, the first side panel defining a groove to allow the sliding means to slide therein and thereby guide the storage device into the mounting bracket, the second side panel defining a pair of through holes in alignment with the locking holes respectively;
        a clip attached on the second side panel, the clip comprising a central press portion and a pair of palms formed at opposite sides of the clip, each of the palms extending through a corresponding through hole to enter a corresponding locking hole, a distance between the palms being slightly less than a distance between the through holes of the second side panel, each of the palms having barbs extending generally toward the press portion and firmly engaging with the mounting bracket at the corresponding locking hole thereby securing the storage device in the mounting bracket, wherein when the press portion is inwardly pressed, the clip is elastically deformed to cause the palms to move away from each other to release the barbs from the storage device.

8. The electronic device assembly as claimed in claim 7, wherein the clip further vonlpr see a pair of bent portions bent outwardly from opposite free ends of the press portion, a pair of connecting portions extending from free ends of the bent portions and away from each other, and a pair of hands extending inwardly from free ends of the connecting portions, and wherein the palms are formed at ends of the bands respectively.

9. The electronic device assembly as claimed in claim 7, wherein the clip is detachably attached on the second side panel, and wherein when the barbs of the clip engage with the mounting bracket at the corresponding locking holes the clip is not detachable from the mounting bracket and when the barbs are released from the corresponding locking holes the clip is detachable from the mounting bracket.

* * * * *